United States Patent [19]

van Manen et al.

[11] Patent Number: 5,569,476
[45] Date of Patent: Oct. 29, 1996

[54] INJECTION MOLDING MACHINE HAVING A ROTATABLE TURRET

[75] Inventors: Dirk van Manen; Hendrikus J. T. Albers, both of Dalen, Netherlands

[73] Assignee: Inter Tooling Services B.V., Emmen, Netherlands

[21] Appl. No.: 421,160

[22] Filed: Apr. 10, 1995

[51] Int. Cl.⁶ .................................................. B29C 45/42
[52] U.S. Cl. ..................... 425/556; 264/334; 425/436 R; 425/444
[58] Field of Search .................. 425/556, 436 R, 425/444, 443; 264/334

[56] References Cited

U.S. PATENT DOCUMENTS

| | | | |
|---|---|---|---|
| 4,836,767 | 6/1989 | Schad et al. | 425/556 |
| 5,114,327 | 5/1992 | Williamson et al. | |

FOREIGN PATENT DOCUMENTS

| | | |
|---|---|---|
| 283644A3 | 1/1988 | European Pat. Off. . |
| 2160987 | 12/1971 | Germany . |
| 58-158209A | 9/1981 | Japan . |
| 2084907 | 9/1981 | United Kingdom . |
| 0283644 | 1/1988 | United Kingdom . |

*Primary Examiner*—Tim Heitbrink
*Attorney, Agent, or Firm*—Jacobson, Price, Holman & Stern, PLLC

[57] ABSTRACT

An apparatus for the injection moulding of synthetic products, comprising a die provided with a plurality of cavities, a discharge device and a robot device for receiving the products moulded in the cavities of the die and transferring those products to the discharge device, the robot device comprising at least two receiving plates, each capable of receiving a number of moulded products equal to at least once the number of cavities of the die, and a drive device for successively bringing the receiving plates into a receiving position next to the die, and for bringing a receiving plate from the receiving position into a take-over position and back again, in which take-over position the moulded products can be taken over from the die.

14 Claims, 5 Drawing Sheets

INJECTION MOLDING MACHINE HAVING A ROTATABLE TURRET

BACKGROUND OF THE INVENTION

The invention relates to an apparatus for the injection moulding of synthetic products, comprising a die provided with a plurality of cavities, a discharge device and a robot device for receiving the products moulded in the cavities of the die and transferring those products to the discharge device.

Such an injection moulding apparatus is for instance disclosed in European patent application 0283644. The known apparatus is a machine for producing so-called "preforms" for synthetic containers such as PET (polyethylene terephthalate) bottles. The known apparatus has a die comprising a first die half, provided with a plurality of cavities, and a second die half, provided with the same number of cores. In the closed position of the die, the cores extend into the cavities, a space being present around each core in the cavity, which space is to be filled with synthetic material. After the synthetic material has been supplied in fluid form to the cavities and the synthetic material has cooled off sufficiently, the die is opened and a receiving plate of a robot device is brought before the product-carrying member of the die. In the apparatus described in European patent application 0283644, the preforms, after the die has been opened, are located on the cores, but it is also possible that, after the die has been opened, the preforms are located in the cavities. In the first case, the receiving plate of the robot device has cavities adapted to receive the products from the cores. In the second case, the receiving plate of the robot device has Dins or the like adapted to receive the products from the cavities. For this purpose, the die may be provided with ejecting means. Alternatively, the receiving plate may be provided with suction means for promoting taking of the products, optionally in combination with ejecting means of the die.

It is important that after the die has been filled up, the moulded products are removed from the die again as quickly as possible so as to obtain a shortest possible cycle period. This means that the products are still very warm and hence soft and vulnerable at the moment when the products are taken away by the receiving plate of the robot device. As the robot device should be ready again to take over the next set of preforms at the end of the next injection moulding cycle, this also means that the preforms can stay in the robot device only briefly and that the preforms are still very warm and vulnerable at the moment when the robot device delivers the preforms again to the discharge device. Typically, the discharge device comprises a conveyor belt and during the stay on the conveyor belt the preforms are cooled by air and/or fluid.

Because in this manner, the preforms are transferred twice before complete cooling and hardening has taken place, the chance of damage is relatively substantial. In the past, it was attempted to reduce the chance of damage by providing the receiving plate of the robot device with cooling means, such as cooling channels through which cooling fluid flows. However, in the case of a short cycle period, such a cooled receiving plate does not yet provide an optimum result.

For this reason, in European patent application 0283644 it is proposed that the receiving plate be provided with a number of receiving means for moulded products that is a multiple of the number of cavities of the die. In this manner, the moulded products, such as preforms, can stay in the cooled carrier plate for more than one cycle period and be cooled relatively long before the products are transferred to the discharge device.

A drawback of this known apparatus is that the receiving plate becomes large and heavy. Because the carrier plate should be moved back again between the die halves at the end of each injection moulding cycle, a quick reciprocating movement is necessary., which requires more energy as the mass of the receiving plate increases and which is moreover slowed down abruptly each time. Moreover, this quick reciprocating movement, stopping abruptly each time at the end of the path to be traversed by the receiving plate, increases the chance of damage to the products which are still located in the receiving plate.

SUMMARY OF THE INVENTION

The object of the invention is to overcome the above-mentioned drawbacks and generally to provide an improved injection moulding apparatus which on the one hand allows for very short cycle periods, while on the other hand the chance of damage to moulded products is very slight.

To that end, according to the invention, an apparatus of the above-described type is characterized in that the robot device comprises at least two receiving plates, each adapted to receive a number of moulded products equal to at least once the number of cavities of the die, and drive means for successively bringing the receiving plates into a receiving position next to the die, and for bringing a receiving plate from the receiving position into a taking position and back again, in which taking position the moulded products can be taken from the die.

The invention will be further described hereinafter with reference to the accompanying drawings of an exemplary embodiment.

DESCRIPTION OF THE PREFERRED EMBODIMENTS

Figure 1:
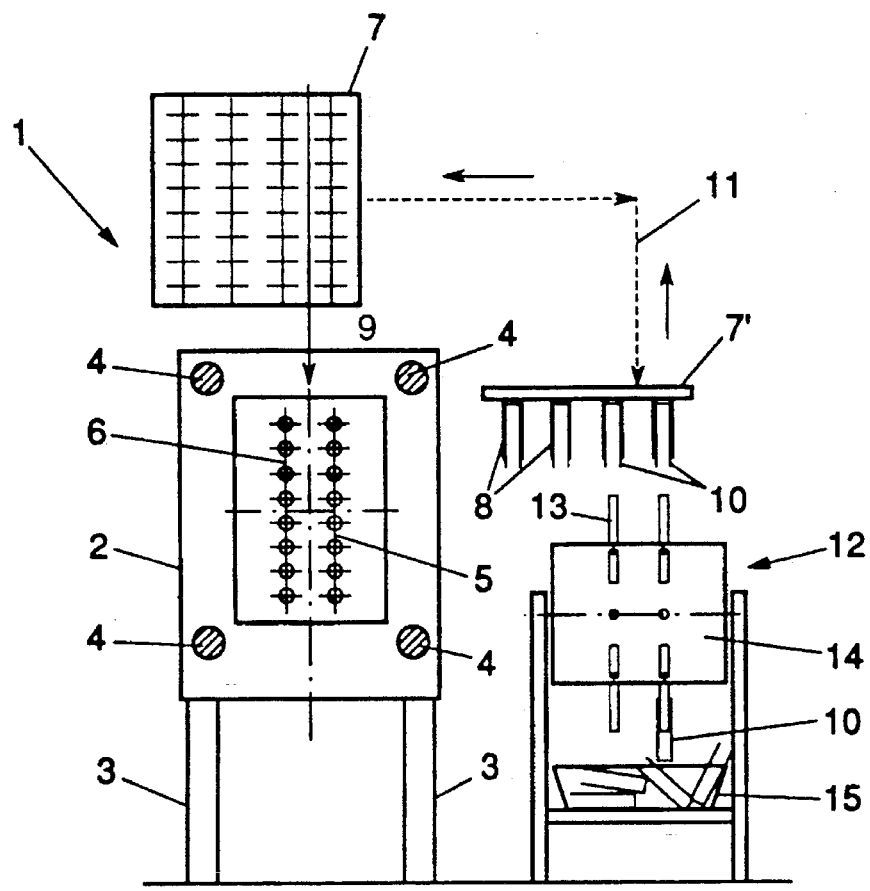
FIG. 1 schematically shows a view of an example of a known injection moulding apparatus for preforms.

FIG. 1 schematically shows a view of a known injection moulding apparatus 1 for preforms for PET bottles. The apparatus shown has a die 2, in this example mounted in vertical position on a base 3. The die 2 consists of two members, movable relatively to each other between a closed and an open position of the die, in horizontal direction transverse to the plane of the drawing. One die member has a plurality of substantially cylindrical cavities and the other die member has the same number of bar-shaped cores, in the closed position of the die extending into the cavities. In the closed position of the die, a narrow clearance is present around the cores, into which hot fluid synthetic material can be injected to mould the preforms.

After the clearances around the pins have been filled with synthetic material and the thus moulded preforms have cooled to some extent, the die is opened. For this purpose, at least one of the die members is movable relatively to the other die member along guides 4. This involves the preforms being left behind either in the cavities or on the cores. In the example shown, the die comprises two rows of eight cavities and cores, designated by 5 and 6 respectively.

The injection moulding apparatus further comprises a robot device, of which only the receiving plate 7 is shown schematically. In the present example, the receiving plate is provided with receiving means 8 having a receiving cavity adapted to take the preforms from the die member provided with cores. For this purpose, the receiving plate can be brought from a position outside the die into a position opposite the die member provided with cores. Taking of the preforms takes place through means known for that purpose, such as, for instance, a stripper plate, not shown.

After the receiving plate has taken the moulded preforms and has been moved out of the die, the die can be closed again for a next cycle. During that next cycle, the robot device moves the receiving plate to above a discharge device 12.

At 7, the receiving plate is drawn in a position in which the receiving plate is ready to be brought between the die halves, as indicated by an arrow 9. At 7', the receiving plate is shown just before the preforms, designated by 10, are transferred onto the discharge device. The path of movement between the two positions is schematically shown at 11.

The discharge device 12 comprises a conveying belt 14 provided with pins 13. The preforms are placed onto the pins 13 by the receiving plate and subsequently discharged to a collecting device 15, shown schematically.

In the example shown, the receiving plate 7 is adapted to receive twice as many preforms as can be moulded in the die per injection moulding cycle. Therefore, the receiving plate is filled in two successive cycles and accordingly transfers the preforms onto the discharge device in two successive cycles. Hence, the preforms moulded during an injection moulding cycle can cool off in the receiving plate each time during the subsequent injection moulding cycle and are only then taken away by the discharge device.

Figure 2:
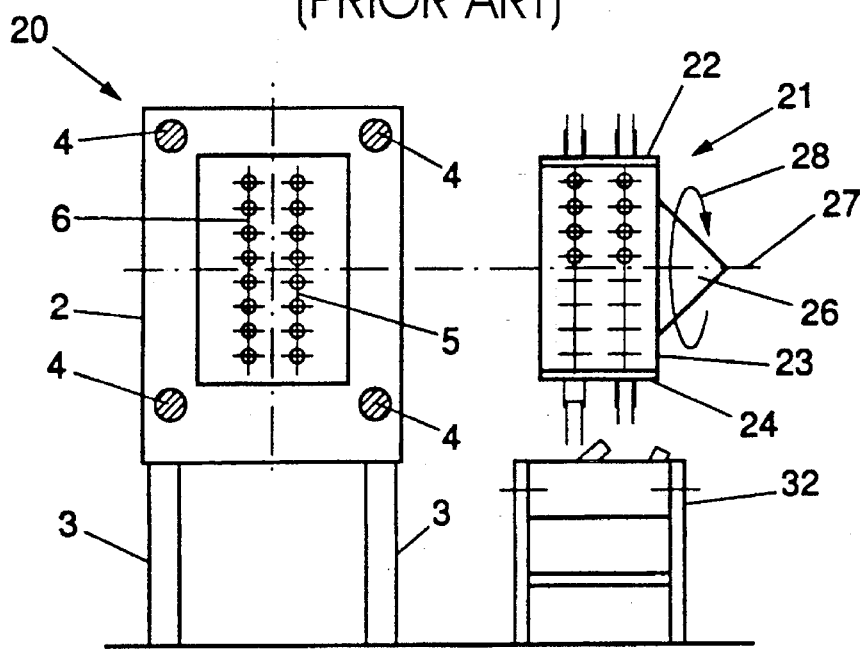
FIG. 2 shows a view of an example of an injection moulding apparatus according to the invention.

FIG. 2 schematically shows a view of an example of an apparatus 20 according to the invention. The apparatus shown in FIG. 2 is shown schematically in top plan view in FIG. 3 and in this example has a die 2 with two rows 5,6 of eight moulding cavities similar to that of the known apparatus of FIG. 1.

Figure 3:
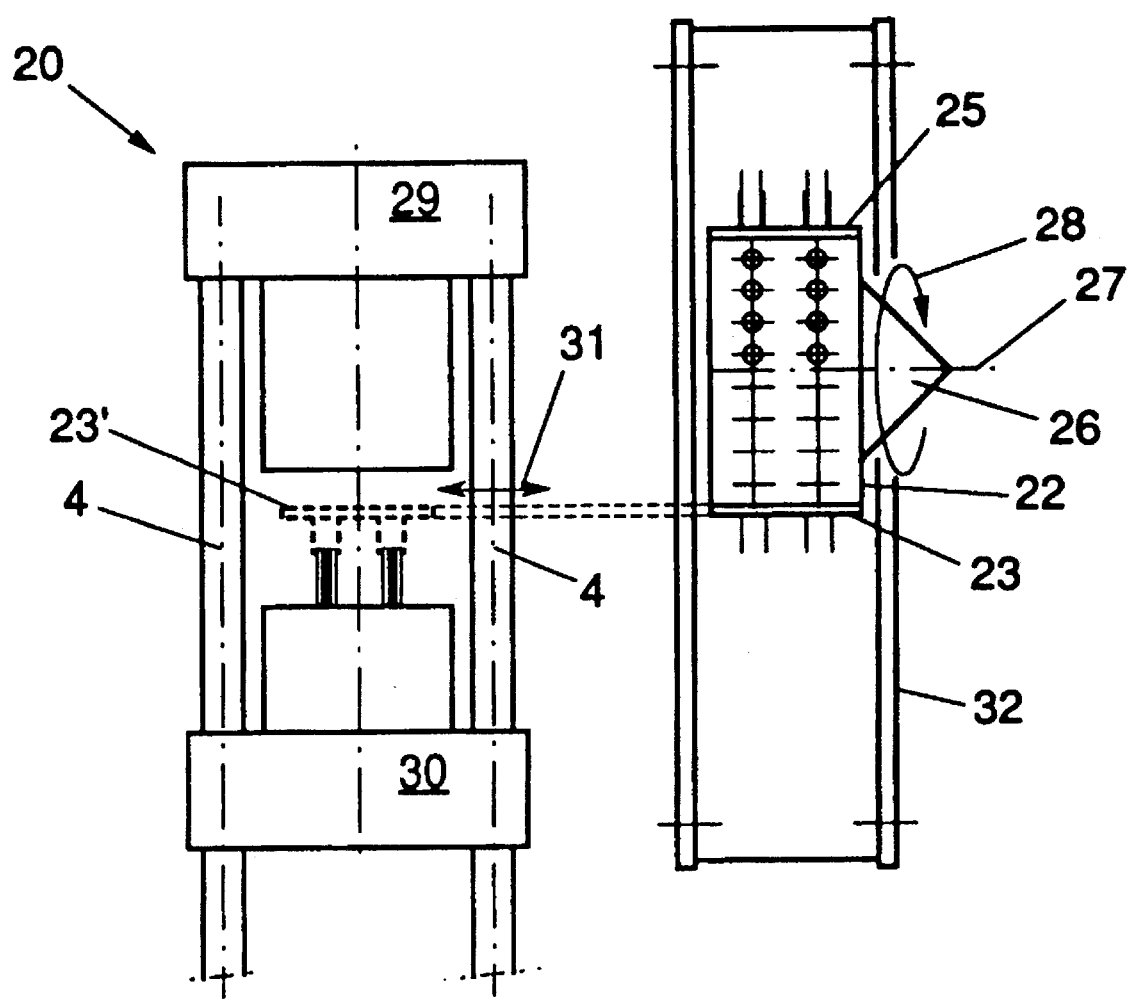
FIG. 3 schematically shows a top plan view of the apparatus of FIG. 2.

The injection moulding apparatus 20 of FIG. 2 differs from the known apparatus 10 of FIG. 1 in that the robot device 21 has four receiving plates 22,23,24 and 25, three of which are visible in FIGS. 2 and 3.

The receiving plates are mounted on a turret, schematically designated by 26 in FIGS. 2 and 3, capable of rotating around a shaft 27 as indicated by an arrow 28. The turret 26 is disposed next to the die in such a manner that when the die is open, one of the receiving plates can be inserted between the die halves 29,30 to receive the moulded products, as indicated in FIG. 3 at 23' by interrupted lines and by an arrow 31.

In this example and in the next examples, each receiving plate has as many receiving locations as the number of moulding cavities of the die. However, it is possible to provide the receiving plates with a number of receiving locations that is an even multiple of the number of moulding cavities of the die.

In the example shown, each receiving plate has four positions, taken up during successive injection moulding cycles. These are a receiving position, a first and a second cooling position, and an ejecting position. In FIGS. 2 and 3, the receiving plate 23 is in the receiving position, while plate 24 is in the ejecting position. The plates 22 and 25 are in the cooling positions.

During the next injection moulding cycle, the plate 24 takes up the receiving position and the plate 25 takes up the ejecting position. Accordingly, the plates 22 and 23 are in the first and second cooling positions. In this example, the receiving plate should be available again for receiving newly moulded products only after four injection moulding cycles, so that the products can cool for a relatively long period.

As soon as a receiving plate of the robot device has been filled with newly moulded products, the plate has to make only one linear movement from the position between the die halves to the rest position. Braking my be effected relatively slowly, because the same plate is moved between the die halves only after a number of injection moulding cycles. Between these two linear movements only one rotation of the turret takes place, which may also be effected relatively slowly. Hence, the chance of damage to the products, still soft, as a consequence of the movements carried out by the receiving plate is very small.

Further, when the products leave the receiving plate they have already cooled off to such an extent that the products can be dropped loosely onto the discharge device 32 without causing damage. Therefore, a belt provided with receiving means is not necessary.

Figure 4:
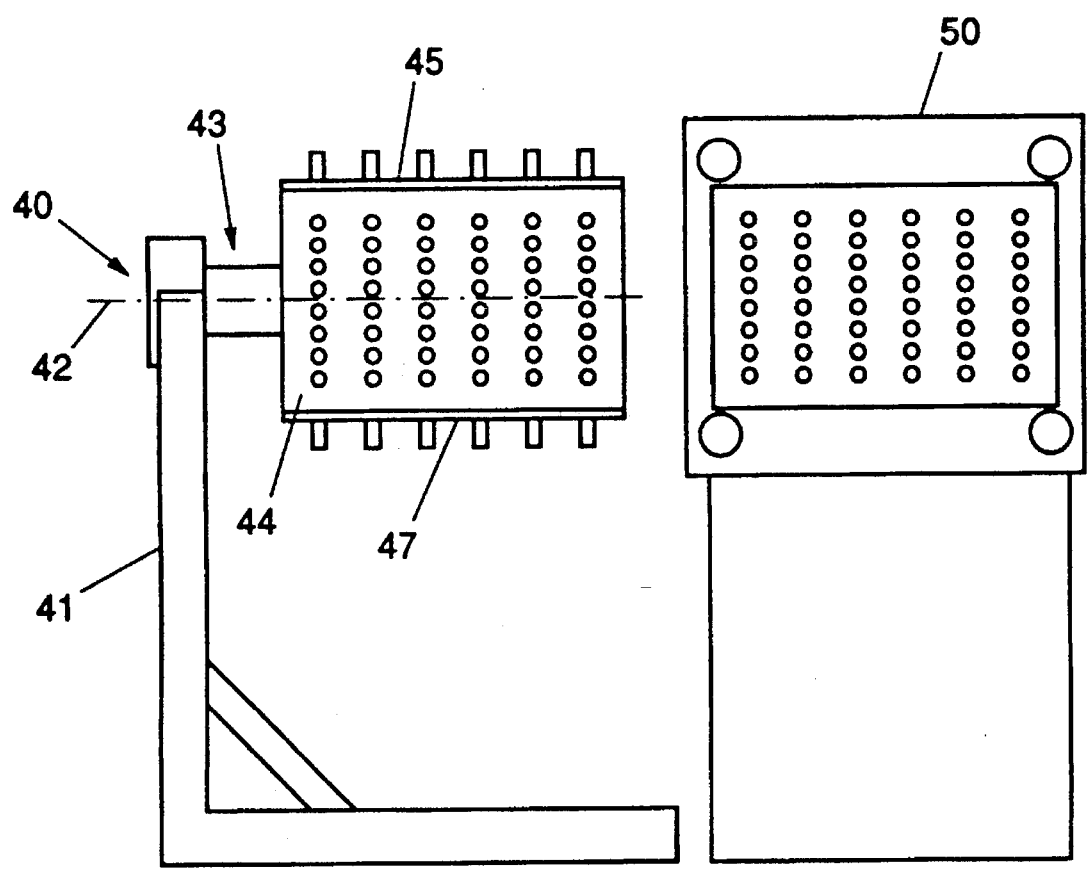
FIG. 4 schematically shows a variant of a part of the apparatus of FIG. 2.

For completeness' sake, FIGS. 4–7 once again illustrate schematically the operation of an apparatus according to the invention. FIG. 4 shows in side view a robot device with a turret according to the invention, disposed next to a die for moulding preforms.

In the example shown, the robot device 40 comprises a base 41, carrying a turret 43 rotatable around a shaft 42. In this example, the shaft 42 is a horizontal shaft, but a different orientation is possible. It is important that the turret be positioned relatively to the die 50 in such a manner that the receiving plates, each in one of the positions of the turret, can be inserted between the die halves in a simple manner, preferably in a linear movement.

In the example shown, the die has six rows of eight moulding cavities. The turret comprises four receiving plates, each of which also has six rows of eight receiving locations for moulded products.

Figure 5:
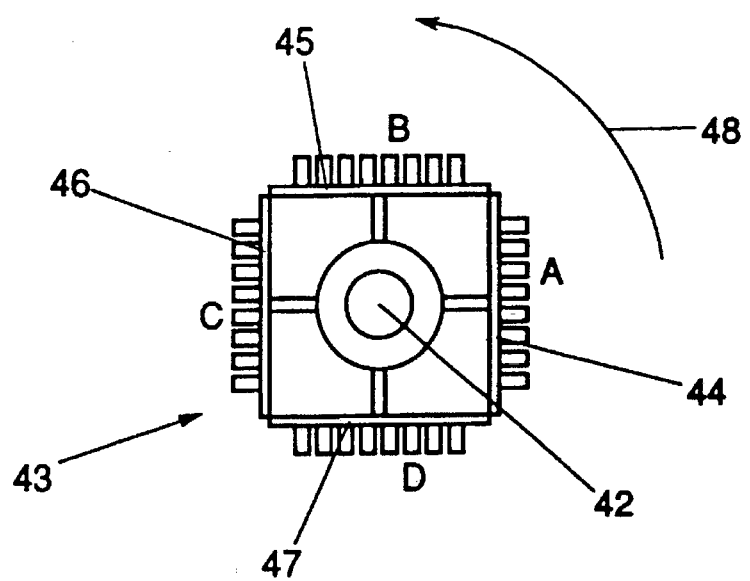
FIG. 5 schematically shows an end view of the robot device of FIG. 4.

FIG. 5 shows the turret of FIG. 4 in end view without the base. Each plate successively takes up the receiving position A, the cooling positions B and C and the delivery position D, with the turret rotating in the direction of the arrow 48.

Figure 6:
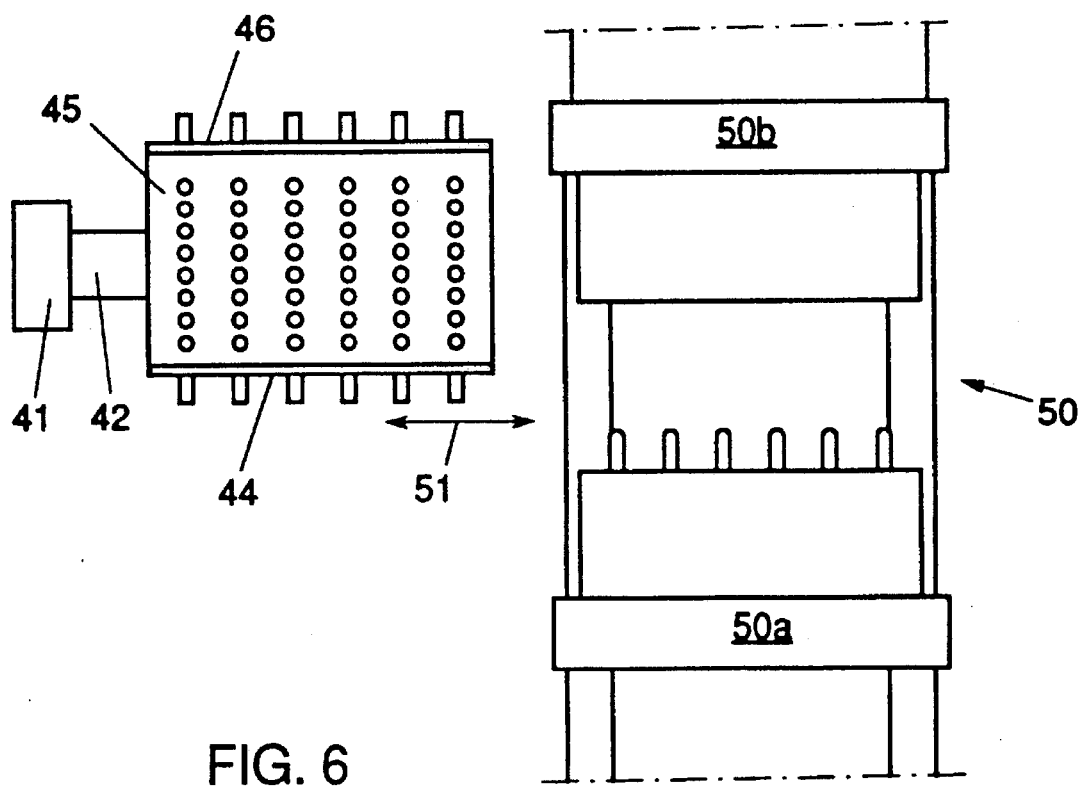
FIGS. 6 and 7 schematically illustrate, by means of a top plan view, the operation of a robot device according to the invention.
Figure 7:
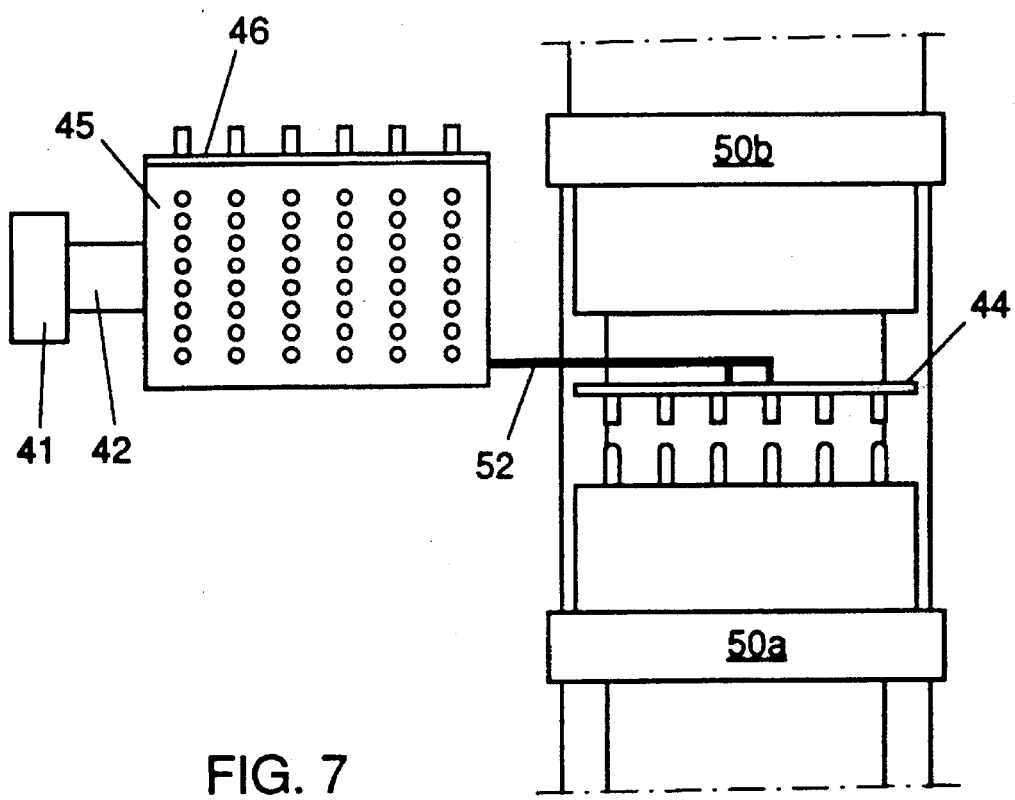

FIG. 6 shows in top plan view the die 50 with the die halves 50a and 50b in the moved-apart position. Now, as indicated by an arrow 51, the receiving plate 44 can be moved before the die half 50a carrying the moulded products. For this purpose, the turret in this example is provided with at least one extensible arm 52, carrying the plate which is in position A, as is shown in FIG. 7.

The desired movements of the receiving plates, such as the rotation of the turret and the reciprocating movement of the plate in the receiving position, can be realized in various manners known per se by means of pneumatic, hydraulic or electric drive means. It is possible to mount each plate on an extension arm, energized as soon as the plate is in the receiving position. It is also possible to apply a stationary extension arm, each time engaging and carrying the receiving plate, which is in the receiving position at a particular moment.

After the foregoing, various modifications will readily occur to a skilled person. For instance, the receiving plates may or may not be provided with cooling channels or the like.

Because after successive injection moulding cycles a different receiving plate is used each time to clear the die, very short cycles are possible. As a result, the products are still relatively soft at the moment when the products are received by a receiving plate.

According to a further elaboration of the inventive concept, use can be made hereof to round (sharp) sprues of the product.

Figure 8:
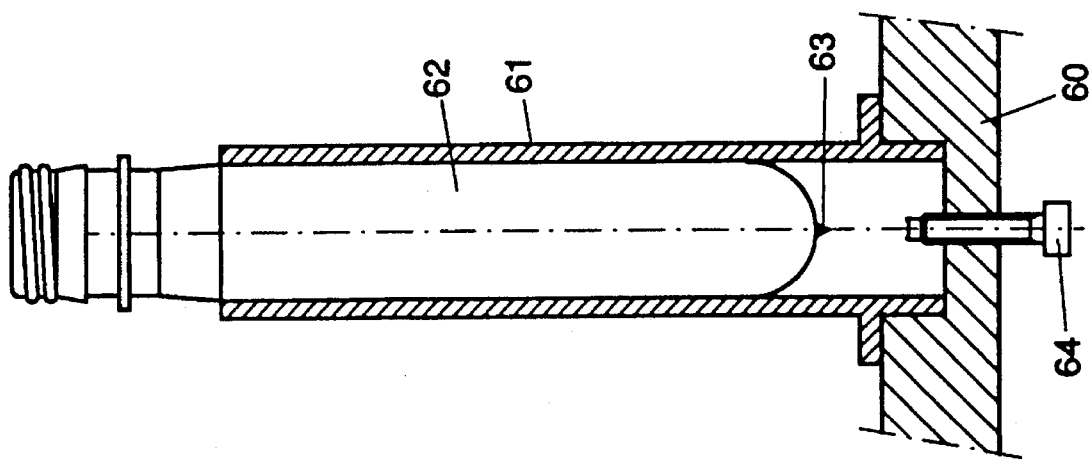
FIGS. 8 and 9 schematically show a detail of a robot device according to the invention.
Figure 9:
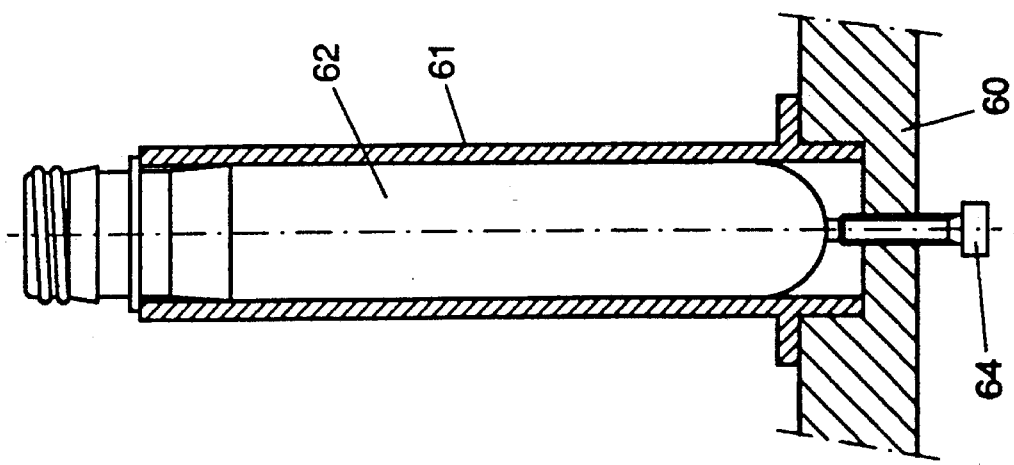

The above is shown schematically in FIGS. 8 and 9.

FIG. 8 and FIG. 9 each show a portion of a receiving plate 60 comprising receiving means 61 adapted to the product, in this example designed as loose adaptors. FIG. 8 shows a preform 62, partially accommodated in the adaptor 61 and having a sprue 63 at its end extending into the adaptor. Located within the receiving cavity, at the bottom thereof, is a preferably settable stop 64, receiving and smoothing or rounding the sprue, as shown in FIG. 9.

We claim:

1. An apparatus for injection moulding of synthetic products, comprising a die provided with a plurality of cavities, a discharge device and a robot device for receiving the products moulded in the cavities of the die and transferring said products to the discharge device, characterized in that the robot device comprises at least two receiving plates, each adapted to receive a number of moulded products equal to at least once the number of cavities of the die, and drive means for successively bringing each receiving plate into a receiving position next to the die, and for successively bringing each receiving plate from the receiving position into a take-away position inside the die and back again, in which take-away position the moulded products can be taken away from the die.

2. The apparatus according to claim 1, characterized in that the drive means are designed such that the receiving plates are each successively brought from the receiving position into an ejecting position.

3. An apparatus according to claim 2, characterized in that the drive means are designed such that after the receiving position and prior to the ejecting position each receiving plate is brought into at least one cooling position.

4. An apparatus according to claim 3, characterized in that after the ejecting position each receiving plate is brought into the receiving position again.

5. The apparatus according to claim 1, characterized in that the turret comprises four receiving plates, mounted in the form of a drum, square in section, said drum being rotatable around a central shaft.

6. The apparatus according to claim 1, characterized by at least one extensible arm adapted to bring a plate which is in the receiving position into and out of the take-away position.

7. The apparatus according to claim 1, characterized in that each receiving plate comprises receiving means, each receiving means being provided with at least one stop for smoothing or rounding a sprue of a corresponding one of said moulded products.

8. A robot device for transferring to a discharge device synthetic products made by an injection moulding apparatus having a die which, in turn, is provided with a plurality of cavities, said robot device comprising:

at least two receiving plates, each adapted to receive a number of moulded products equal to at least once the number of cavities of the die, and drive means for successively bringing each receiving plate into a receiving position next to the die, and for bringing a receiving plate from the receiving position into a take-away position inside the die and back again, in which take-away position the moulded products can be taken away from the die wherein the receiving plates are mounted on a rotatable turret with a plurality of discrete positions, while in each discrete position one of the receiving plates is in the receiving position.

9. The robot device according to claim 8, characterized in that the drive means are designed such that the receiving plates are each successively brought from the receiving position into an ejecting position.

10. The robot device according to claim 9, characterized in that the drive means are designed such that after the receiving position and prior to the ejecting position each receiving plate is brought into at least one cooling position.

11. The robot device according to claim 10, characterized in that after the ejecting position each receiving plate is brought into the receiving position again.

12. The robot device according to claim 8, characterized in that the turret comprises four receiving plates, mounted in the form of a drum, square in section, said drum being rotatable around a central shaft.

13. The robot device according to claim 8, characterized by at least one extensible arm adapted to bring a plate which is in the receiving position into and out of the take-away position.

14. The robot device according to claims 8, characterized in that each receiving plate comprises receiving means, each receiving means being provided with at least one stop for smoothing or rounding a sprue of a corresponding one of said moulded products.

* * * * *